May 20, 1969

J. V. FREDD 3,444,783

OPERATOR DEVICES

Filed March 1, 1965

INVENTOR
John V. Fredd

BY *Hastings Ackley and Walter J. Jaym*

ATTORNEYS

INVENTOR
John V. Fredd
BY
ATTORNEYS

United States Patent Office 3,444,783
Patented May 20, 1969

3,444,783
OPERATOR DEVICES
John V. Fredd, Dallas, Tex., assignor to Otis Engineering Corporation, Dallas, Tex., a corporation of Delaware
Filed Mar. 1, 1965, Ser. No. 435,990
Int. Cl. F15b 15/26, 11/00, 13/00
U.S. Cl. 91—41                                      15 Claims

ABSTRACT OF THE DISCLOSURE

A pressure fluid actuated operator device movable to at least two positions for operating other devices and adapted to be releasably locked in each of said positions, having fluid pressure differential pulse code signal responsive operator means for actuating and releasing the locking means of said operator device in response to selected predetermined pulse code pressure differential signals transmitted to said operator device from a remote source of pressure fluid; and a system utilizing a plurality of said operator devices in which each is selectively operated in response to a predetermined selected pulse code pressure differential signal transmitted to all of said operator means by fluid pressure.

---

This invention generally relates to operator devices and more particularly relates to fluid actuated devices operable in response to predetermined fluid pressure levels or combinations of such pressure levels to perform a useful work function.

It is an object of the invention to provide a new and useful operator device which performs a useful work function in response to a predetermined pressure signal or signals transmitted to the device.

It is another object of the invention to provide a fluid actuated operator device which is non-responsive either to a fluid pressure below a predetermined value or to fewer than a predetermined number of pressure pulses of a predetermined value.

It is a further object of the invention to provide a fluid actuated operator device which will remain in a locked position or will return to a locked position in response to a fluid pressure in excess of the predetermined pressure level at which the device is designed to function.

It is a still further object of the invention to provide an operator device having a piston which reciprocates to perform a useful work function in response to a predetermined pressure pulse code transmitted to the assembly from a remote location.

It is a still further object of the invention to provide an operator device including a piston which is power driven in each direction and unlockable and lockable at two extreme positions in response to a predetermined pressure pulse code.

It is another object of the invention to provide a pressure pulse coded operator device in which a piston is returned to a locked condition from an unlocked condition in response to a pressure in excess of the particular predetermined pressure at which the assembly is designed to function.

It is an additional object of the invention to provide in a pressure pulse coded operator device a collet lock on the piston which is returnable to a locked position within expandable collets when subjected to a pressure pulse greater in magnitude than the pressure level of the pulses to which the device is designed to respond.

It is a further object of the invention to provide a pressure pulse coded operator device in which the piston is non-responsive to a pressure below the predetermined pressure for which the device is coded.

It is a further object of the invention to provide a fluid operated system including a plurality of pressure pulse coded operator devices each of which is operable in response to a predetermined pressure pulse or a combination of pressure pulses transmitted to the assemblies from a central control station.

It is another object of the invention to provide a combination of operator devices which may be actuated by pressure pulses transmitted through a common single conduit leading to all of the devices.

Additional objects and advantages of the invention will be readily apparent from the reading of the following description of a device constructed in accordance with the invention, and reference to the accompanying drawings thereof, wherein:

Figure 1:
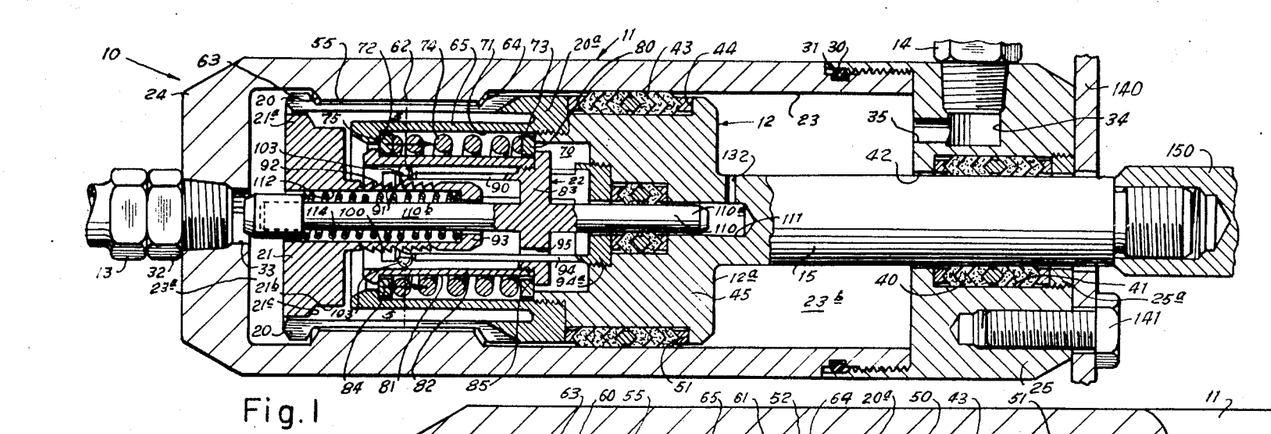
FIGURE 1 is a longitudinal view partly in section and partly in elevation illustrating a pressure pulse coded operator device in accordance with the invention.

Referring particularly to FIGURE 1, a pressure pulse coded operator device 10 includes a cylinder 11 housing a reciprocable piston assembly 12 which is moved within the cylinder between extreme end positions by fluid introduced into the cylinder through either the line 13 or the line 14, depending upon the direction in which the piston is displaced. The device performs a useful work function through the piston rod 15 connected to one end of the piston. For example, the piston rod may be connected to a valve which is moved between selected positions by the rod. The piston is lockable at its extreme end positions by the primary collet fingers 20 which are expanded and contracted in response to the movement of the collet lock 21 controlled by the reciprocating collet lock operator 22 carried by the piston. The collet lock operator is movable within and relative to the piston by a preselected pressure pulse code or series of pressure pulses whose peak pressures fall within a predetermined pressure range communicated to the assembly through a fluid in either of the lines 13 or 14.

The cylinder 11 is provided with a cylindrical chamber 23 closed at one end by an end member 24 formed integral with the side wall of the cylinder and closed at the other end by a head 25 threaded over the end of the cylinder and sealed by an O-ring 30 positioned in an external annular recess 31 formed in the outer wall of the cylinder. The portion of the chamber 23 to the left of the piston shall be considered as chamber 23a and that to the right as chamber 23b. The line 13 is connected into the cylinder by the fitting 32 threaded into the passage 33 through the end member 24. The line 14 is threaded into the passage 34 in the head member 25 to conduct fluid to and from the chamber 23b through the horizontal flow passage 35 formed in the head member. An annular seal assembly 40 is held within the internal annular recess 41 in the head member by an annular retainer ring 25a threaded into the head member to seal between the head member and the piston rod 15 which extends through the bore 42 of the head member.

Figure 2:
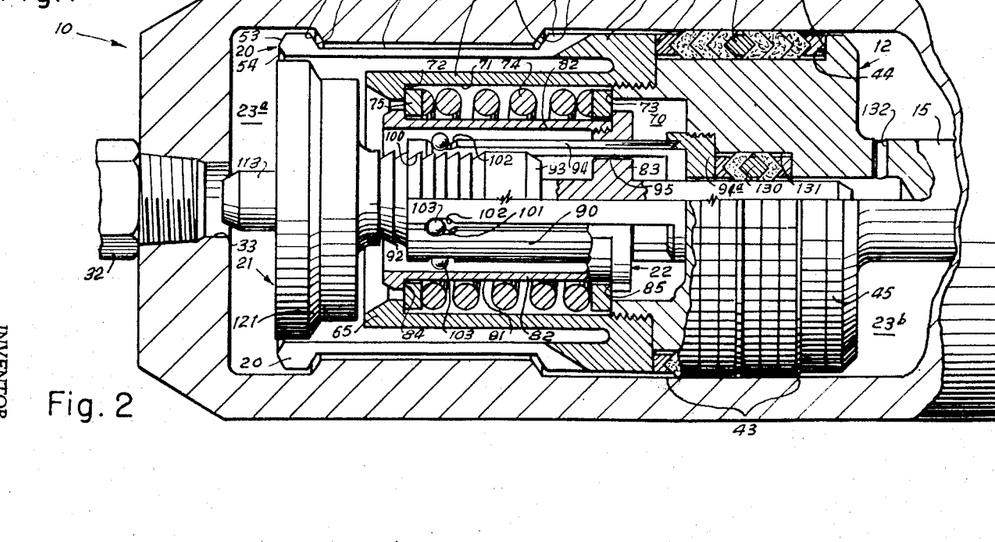
FIGURE 2 is an enlarged view partly in section and partly in elevation of the piston and a portion of the cylinder of the device shown in FIGURE 1.
Figures 7, 12:
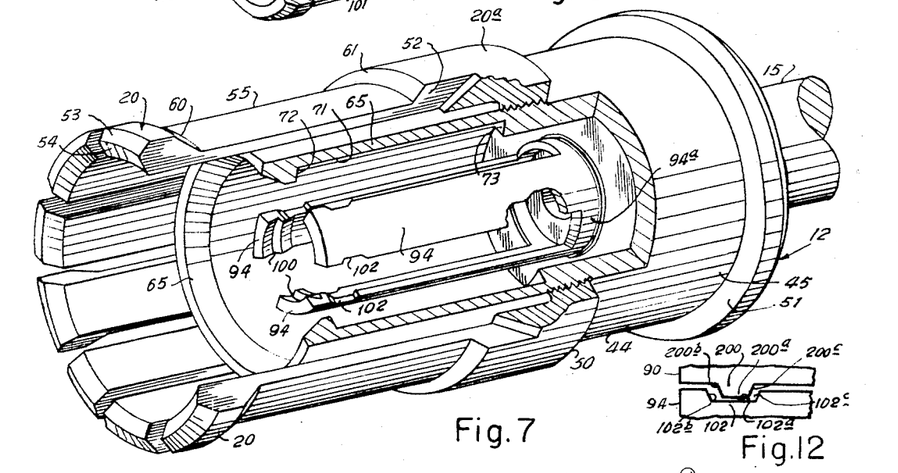
FIGURE 7 is a perspective view, partly in section and partly in elevation, of the piston assembly of the device of FIGURE 1.
FIGURE 12 is a fragmentary view in elevation of the free ends of alternative forms of locking and check pawls when the pawls are in alignment; and, FIGURE 13 is a fragmentary view in elevation of the adjacent driving and check pawls of FIGURE 12 with the pawls misaligned and cammed apart by the cooperative reaction of the recess and lug on the adjacent pawls.

Referring to FIGURES 1 and 7, the seal assembly 43 is disposed within the annular recess 44 around the body 45 of the piston 12a to seal between the piston and the wall of the chamber 23 within the cylinder. The seal assembly is held against longitudinal movement on the piston body by the end shoulders 50 and 51 of the recess. As best illustrated in FIGURE 7 the resilient primary collet fingers 20 are formed on and extend from the base ring 20a threaded on the piston body. The collet fingers are radially spaced and separated by the longitudinal recesses 52 to provide adequate space between the collet fingers that they may freely contract and expand for the locking of the piston assembly within the chamber of the cylinder. Formed on the outer end of each of the collet fingers is an outwardly facing locking surface 53 and an inwardly facing locking surface 54 while the body of each collet finger is provided with an external recess 55 defined by the outer, opposing locking surfaces 60 and 61. The collet fingers cooperate with the internal annular flange 62 formed within the chamber 23 to lock the piston at its extreme end positions, the piston being shown in one extreme position in FIGURE 1 and the other extreme position in FIGURE 4. The annular locking flange 62 provides one inwardly facing shoulder 63 for engaging the locking surface 60 on the collet fingers and another inwardly facing shoulder 64 for engaging the locking surface 61 on the collet fingers when the piston is in the extreme left position as illustrated in FIGURES 1 and 2. In this position the locking flange is fully disposed within the locking recesses 55 of the primary collet fingers. When the piston is in the extreme right position illustrated in FIGURE 4 the locking surface 53 on the collet fingers is engageable with the shoulder 64 of the locking flange to prevent back to the left movement of the piston until the collet fingers are retracted.

The primary collet fingers are locked in expanded position by the flange 21a on the collet lock. When the collet fingers are cammed inwardly around the reduced portion 21b of the collet lock, the lock surfaces 54 of the fingers are engageable with the shoulder 21c on the flange, as in FIGURE 3.

Referring again to FIGURES 1 and 7, a sleeve 65 extends from the base ring 20a spaced apart within and concentric with the primary collet fingers 20 forming a chamber 70 within the piston in which the collet lock operator 22 is disposed. The internal annular recess 71 is formed within the sleeve 65 with the end limits of the recess being defined by the inner shoulders 72 and 73.

Figures 6, 9, 10, 11:
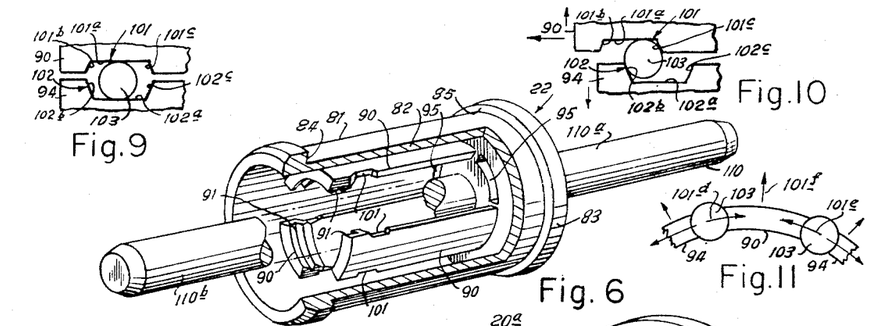
FIGURE 6 is a perspective view, partly in elevation and partly in section, of the collet lock operator of the device of FIGURE 1.
FIGURE 9 is a fragmentary view in elevation of the free ends of adjacent driving and check pawls when the pawls are in alignment, illustrating the facing recesses in the pawls and the locking ball disposed within the recesses.
FIGURE 10 is a fragmentary view in elevation of the pawls and locking ball illustrated in FIGURE 9 showing the driving pawl moved relative to the check pawl with the locking ball camming the pawls apart.
FIGURE 11 is a diagrammatic representation of a driving pawl and the adjustment check pawls illustrating the reaction forces of the locking balls on the pawls forcing the pawls radially outward when the pawls are misaligned.

The collet lock operator spring 74 is partially disposed within the recess 71 between a spring ring 75 engageable by the shoulder 72 and a spring ring 80 engageable by the shoulder 73. The collet lock operator 22 extends through the spring 74 and is operatively connected with the spring through the spring rings 75 and 80 which along with the spring are partially disposed within the external recess 81 of the sleeve 82 extending from the base plate 83 of the collet lock operator. To facilitate assembly, the sleeve 82 is threaded to the base plate as shown. The spring rings 75 and 80 are engageable, respectively, with the end shoulders 84 and 85 of the recess 81. Thus, the inner portions of the spring 74 and the spring rings 75 and 80 are within the recess 81 of the sleeve of the collet lock operator while the outer portions of the spring and spring washers are within the recess 71 of the sleeve 65 of the piston. The collet lock driving pawls 90 extend from the base plate 83 in concentric relationship within the sleeve 82 and are radially spaced apart from each other as best illustrated in FIGURE 6. Each of the driving pawls has an internal annular locking recess 91 which is shaped to receive one of the annular teeth 92 formed on the hollow hub 93 of the collet lock 21. Each of the collet lock check pawls 94 extends from a base ring 94a threaded into the body 45 of the piston 12 through one of the curved slots 95 in the base plate 83 between the driving pawls. Each of the check pawls projects into the space between each pair of the driving pawls within the sleeve 82 of the operator member 22. The check pawls fit in sliding relationship through the slots 95, which are best seen in FIGURE 6. The check pawls are concentric with the sleeve 82 and are interposed between the driving pawls when the operator member 22 and the piston 12 are assembled in the relationship illustrated in FIGURES 1–4, the two sets of pawls being so aligned that their respective inner and outer surfaces are within common concentric hypothetical cylinders. The driving and check pawls are formed in the shape of collet fingers which are resilient enough to allow the ends of the pawls to move between an expanded position when they are disengaged from the hub of the collet lock and contracted engaged positions. Each of the check pawls has an internal locking recess 100 shaped to conform to a tooth 92 on the hub of the collet lock so the pawls will engage the hub to lock the collet lock against movement relative to the piston.

Figure 5:
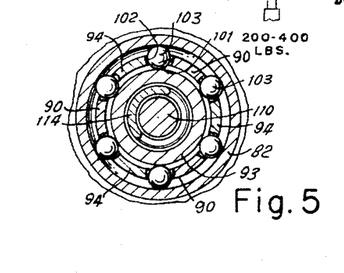
FIGURE 5 is a view in cross-section along the line 5—5 of FIGURE 1.

A recess 101 is formed in each side edge near the free end of each of the driving pawls 90, as illustrated in FIGURE 6. Each of the check pawls 94 has similar cooperating recesses 102 formed along its side edges, as shown in FIGURE 7. The recesses 101 and 102 are so positioned longitudinally in the pawls that when the pawls are interposed between each other and aligned longitudinally, as illustrated in FIGURES 2 and 5, each of the recesses 101 in a driving pawl will face a recess 102 in an adjacent check pawl. A locking ball 103 is disposed between each pair of adjacent pawls within the space defined by the facing cooperating recesses 101 and 102. As best illustrated in FIGURES 2 and 9, the spaces between the adjacent driving and check pawls are each so narrow that when the pawls are within their normal operating range of relative longitudinal positions, the balls 103 may be contained between the pawls only with the space provided by the cooperating recesses. As will be explained in more detail hereinafter in connection with the operation of the operator device, the driving and check pawls remain within a predetermined degree of longitudinal alignment at all times during the operation of the device except when pressure in excess of a predetermined maximum is applied to the device which results in excessive misalignment of the pawls. The functions of the recesses in the pawls and locking pawls may be more readily appreciated by reference to FIGURES 9-11 which illustrate the pawls both in aligned relationship and when the pawls have been excessively misaligned, as when the pressure is applied in excess of the required pressure for unlocking the piston assembly. The recesses 102 in each of the check pawls has a bottom surface 102a and end sloping shoulders 102b and 102c, while each of the recesses in the driving pawls similarly has a bottom surface 101a and end shoulders 101b and 101c. It will be obvious from FIGURE 9 that so long as the pawls are near enough to longitudinal alignment that the surface of the locking ball may contact the bottom surface of each of the recesses, the ball remains fully within the recesses and the normal distance is maintained between the pawls. As each driving pawl moves longitudinally relative to an adjacent check pawl the locking ball rolls along the bottom surfaces 101a and 102a of the facing recesses containing the ball. So long as the ball is in contact with each of the bottom surfaces the pawls retain their normal spacing from each other. Assuming, by way of example, that the driving pawls are moving toward the ends of the check pawls as indicated in FIGURE 10 the balls 103 will remain in contact with the bottom surfaces of the recesses until the balls contact the shoulders 102b and 101c of the check and driving pawls, respectively. When the shoulders contact the ball, further relative movement of the pawls in the direction illustrated causes the balls to force the shoulders outwardly away from the balls thus widening the gap or space between the adjacent pawls. The relative movement of the pawls forces the shoulders 102b and 101c toward each other narrowing or reducing the space to accommodate the locking ball thus effecting a squeezing action on the locking ball with equal and opposite force being applied by the confined balls to the resilient pawls causing the pawls to spring radially outwardly. FIGURE 11 shows the reaction force of the locking balls on opposite sides of one of the pafls with the reaction forces 101d and 101e from the balls being directed inwardly toward the centerline of the pawl and the resultant of such forces indicated by the reference numeral 101f being directed radially outwardly thus forcing the outward expansion of the pawl. All of the pawls are equally affected by the reaction force of the locking balls being squeezed between the pawls by the displaced recesses as previously explained thus resulting in a net expansion of the complete ring of driving and check pawls around the hub of the collet lock to the extent that the pawls are expanded out of locking engagement with the teeth of the hub. The edges of the pawls may be concave as illustrated to facilitate retention of the locking balls between the pawls and to cause the balls to move outwardly with the pawls.

The collet lock operator 22 is supported within the chamber 70 of the piston on the shaft or stem 110 which extends at one end 110a into the bore 111 of the piston and extends at the other end 110b concentric with the pawls and through the bore 112 of the collet lock. The end 110b of the shaft is covered by a cap 113 which cooperates with the inner end of the bore 112 within the collet lock hub to confine a collet lock spring 114 adapted to compress to bias the collet lock toward the operator member. The collet lock, including its hub, is slidable over the shaft 110.

An annular seal assembly 130 is disposed within the annular recess 131 in the piston body 45 to form a seal with the section 110a of the shaft 110 within the bore 111 so that when a pressure differential is applied across the shaft the shaft may be reciprocated relative to the piston. A lateral flow passage 132 extends through the piston rod into the bore 111 so that a fluid may flow between the bore and the chamber 23b during reciprocation of the collet lock operator within the piston.

The operator device 10 is secured in any desired position to a suitable support member 140 by bolts 141 which are threaded into the head member 25. The piston rod is connected to and actuates the apparatus 150, which may be a valve or any other appartus which is operable by the reciprocating action of the operator device.

The operator device may function singly in response to a particular predetermined range to perform a desired work function, such as the opening and closing of a valve. Also, several of the operators may be combined in a single fluid system actuated from a central control location through common flund supply and return lines with each of the devices being constructed to respond to different pressure pulse codes. For example, in FIGURE 8 the operator devices 10, 10a, 10b and 10c are all connected to the common fluid lines 13 and 14 extending to a controller 160 which may include a four way valve and a pressure regulator valve for selectively supplying and returning fluid through lines 13 and 14, and for controlling the pressure of the fluid supplied through the lines. When the controller is supplying fluid through the line 13 it will be returning fluid through the line 14. The controller is connected to a source of fluid under pressure through the lines 161 and 162. The operator of the system utilizes the controller 160 to select which of the lines 13 and 14 serves as supply and which as return in addition to adjusting the pressure of the fluid going to the operator devices.

Figure 4:
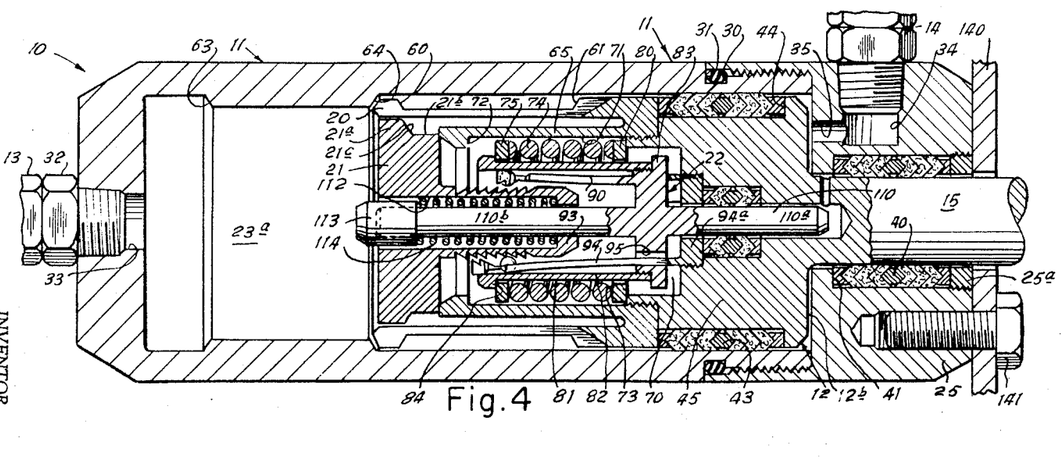
FIGURE 4 is a view partly in elevation and partly in section of the device of FIGURE 1 showing the piston in its extreme right position with the primary collet fingers expanded into locking engagement with the cylinder boss.
Figure 8:
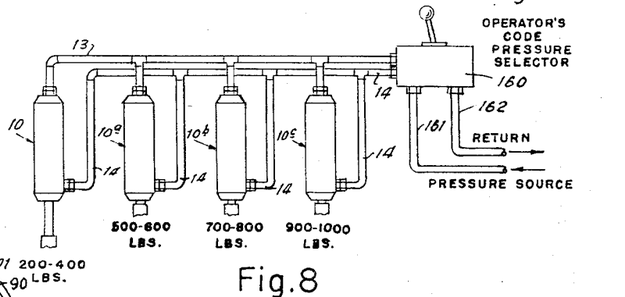
FIGURE 8 is a schematic representation of a fluid actuated system including a plurality of the operator devices of FIGURE 1.

The operator device 10 is connected to the fluid lines 13 and 14 and secured to the particular apparatus to be operated by the device, such as a valve or any other apparatus which requires limited longitudinal motion to perform its particular function. The piston assembly 12 of the operator device is operable between two extreme end positions which in the embodiment illustrated in FIGURES 1-7 are the extreme left position as shown in FIGURE 1 and the extreme right position as illustrated in FIGURE 4. It must be emphasized here, however, that the operator device may be oriented in any position desired ranging from the horizontal to the vertical as represented in the system of FIGURE 8.

The first phase of the operation of the operator device 10, if its piston is initially in the left position illustrated in FIGURE 1, is the movement of the piston to the extreme right position illustrated in FIGURE 4. In the position illustrated in FIGURE 1 the piston is locked in the extreme left position by the engagement of the locking surfaces 60 on the primary collect fingers 20 with the annular shoulder 63 on the boss 62 within the cylinder. Before the piston can move toward the right it is necessary that it be unlocked by retraction of the primary collet fingers 20. The fluid controller, such as the controller 160 in the system of FIGURE 8, is adjusted to allow fluid to flow through the line 13 to the operator device while allowing fluid return through the line 14. To free the primary collet fingers to be cammed inwardly the collet lock is moved to the left far enough to remove the flange 21a from within the collet fingers so that they may move inwardly around the reduced portion 21b of the collet lock. This leftward movement of collet lock is effected by the operator member 22 which reciprocates within the piston to "ratchet" or jack the collet lock to the left. The entire operator member, as best visualized by reference to FIGURE 6, reciprocates within and relative to the piston 12, which is shown separately in FIGURE 7, with the piston, including the primary collet fingers and the check pawls along with the sleeve 71, remaining in a fixed position during the oscillation of the collet lock operator until the piston is unlocked and can be displaced to the right. The fluid under pressure is introduced through the line 13 and the passage 33 into the left portion 23a of the chamber 23 to establish a pressure differential across the piston and the collet lock operator since the pressure is lower in return line 14. The piston cannot move because the collet lock is within the primary collet fingers 20 holding the collet fingers outwardly with the locking surfaces 60 of the collet fingers engaging the annular shoulder 63 within the cylinder. The collet lock operator, however, is movable toward the right by the force resulting from the pressure differential across the operator between the chamber 23a and the chamber 23b at the right end of the piston. Any fluid with the bore 111 is free to flow through the passage 132 and the chamber 23b to be returned through the passages 35, 34 and the line 14. The pressure differential acts against the operator member over an effective area defined by the line of contact between the seal assembly 130 and the shaft 110 of the operator. When the pressure of the fluid introduced into the chamber 23a is at a predetermined level, the operator 22 moves toward the right relative to the locked piston with the driving pawls 90 of the operator sliding over the teeth 91 on the hub of the collet lock while the collet lock remains fixed due to the engagement of the check pawls 94 with the teeth on the hub of the collet lock. The check pawls do not move due to their connection with the piston which does not move during the rightward movement of the operator. As the operator moves relative to the piston and the driving pawls slide over the teeth on the hub on the collet lock, the operator spring 74 is compressed as the annular shoulder 84 of the sleeve 82 of the operator member moves toward the shoulder 73 within the sleeve 65 of the piston. The spring ring 75 is forced toward the spring ring 80 which is held fixed by the shoulder 73 resulting in compression of the spring 74. The collet lock's being held against movement by the check pawls causes the spring 114 within the bore of the collet lock to also be compressed due to its confinement between the cap 113 and the inward end of the bore of the collet lock. The characteristics of the springs 74 and 114 and the friction of the driving pawls with the hub determine the distance which the operator member may be moved by the predetermined pressure since the springs resist the movement of the operator member. For example, the springs may be chosen to permit the particular pressure at which the operator device is coded to move the collet lock operator against the springs a sufficient distance to cause the driving pawls 90 to move past one tooth on the hub of the collet lock. Thus, the force resulting from the pressure differential caused by the pressure within the chamber 23a acts against the collet lock operator moving the operator to the right against the springs 74 and 114, both of which are engaged with the collet lock operator and with the piston 12 and the collet lock, respectively, the latter two members remaining in a fixed position during the movement of the collet lock operator to the right. After the collet lock operator has moved in response to the predetermined pressure, the pressure is reduced allowing the spring 74 to expand, forcing the collet lock operator toward the left which, due to the engagement of the driving pawls 90 with a tooth on the hub 93, also moves the collet lock to the left until the spring 75 is back in contact with the shoulder 72 within the sleeve 65 of the piston. Since the collet lock operator had been moved to the right the distance of one tooth on the collet lock hub the return movement of the operator by the operator spring will be the same distance and thus the collet lock will be moved toward the left the length of one tooth back to its neutral position relative to the piston. As the collet lock is moved to the left the piston 12 continues to remain in its locked position as shown in FIGURE 1, and the check pawls 94 of the piston slide over a tooth on the collet lock hub to reengage the collet lock in its new position relative to the piston. The pressure within the chamber 23a is again increased to the predetermined level required to move the collet lock operator to the right the length of another tooth on the collet lock hub against the resistance of the springs 74 and 114 with the pressure then being decreased in the chamber 23a to allow the operator spring to return the collet lock operator to the left pushing the collet lock another length of a tooth to the left. The alternate raising and lowering of the pressure within the chamber 23a is continued until the collet lock has been "ratcheted" from within the primary collet fingers 20 a sufficient distance to allow the collet fingers 20 to spring inwardly to clear the flange 62 so that the piston 12 may be moved to its extreme right position. The check pawls will retain the collet lock in the "unlocked" position until the pawls are released from the hub.

In the particular embodiment of the operator device illustrated, four pressure pulses of a predetermined magnitude will move the collet lock from within the primary collet fingers a sufficient distance since to unlock the primary collet fingers the collet lock must move approximately the length of four of the teeth on the collet lock hub. It will be recognized from previous discussion of the recesses 101 and 102 in the pawls 90 and 94, respectively, that the length of these recesses determines the degree of longitudinal misalignment permitted the pawls without disturbing their normal relationship. Thus, if the predetermined value of each of the pressure pulses employed to unlock the primary collet fingers is calculated to move the collet lock operator the length of one tooth, the recesses 101 and 102 must be long enough to permit longitudinal misalignment of the two sets of collet fingers the length of one tooth without expanding the pawls away from the hub.

If, in unlocking the collet lock operator, one or more fluid pressure pulses of a value below the required predetermined level are transmitted to the chamber 23a, the collet lock operator will not respond as the springs will not be compressed a sufficient distance to cause the driving pawls to engage the next tooth on the collet lock hub. The driving pawls must be moved far enough to engage the next tooth on the hub of the collet lock to move the collet lock.

If the magnitude of the pressure pulses is in excess of the required predetermined value during the first step in unlocking the collet lock, the collet lock operator will be moved to the right more than the length of one tooth on the collet lock hub since the excessive pressure will force compression of the springs 74 and 114 a greater distance than the length of one tooth. FIGURE 10 represents the typical relationship between a pair of the adjacent driving and check pawls when the driving pawls are misaligned with the check pawls more than the distance of the length of one tooth where the length of one tooth is the amount of normal movement or tolerance permitted the pawls during the process of moving the collet lock to unlocked position. As the pawls 90 move the distance of the length of one tooth, the locking balls between the pawls roll along the surfaces 101a and 102a until the balls engage the shoulders 101c and 102d. Further misalignment of the pawls after the balls engage the shoulders causes the locking balls to be squeezed between the shoulders and exert lateral reaction forces against the pawls, as illustrated in FIGURES 10 and 11 and as previously discussed, forcing expansion of the pawls radially outwardly so that the pawls are disengaged from the teeth on the hub of the collet lock. FIGURE 4 also illustrates the excessive misalignment of the pawls causing their disengagement from the collet lock hub. With all of the pawls disconnected from the collet lock operator to the position illustrated in FIGURE 1 without affecting the position of the collet lock. Since the abrupt misalignment of the two sets of pawls has caused the pawls to disengage from the hub of the collet lock, they thus do not move the collet lock and leave it in its previously locked position. Thus, if the collet lock is in its fully locked position, as illustrated in FIGURE 1, a pressure in excess of the predetermined pressure for which the device is coded will have no effect upon the collet lock since the collet fingers are merely misaligned and returned to their initial position without moving the collet lock.

If the collet lock has been partially moved toward open position and a pressure pulse in excess of the predetermined value is transmitted to the chamber 23a the collet lock operator will be moved a sufficient distance to misalign the pawls an excessive amount causing the locking balls to be wedged between the pawls forcing them outwardly out of contact with the hub. During the movement of the collet lock operator to the position which has misaligned the pawls the springs 114 and 74 have been compressed and when the pawls are wedged out of engagement with the collet lock hub the spring 114 expands to return the collet lock to the fully locked position illustrated in FIGURE 1. While the collet lock spring is returning the collet lock to the fully locked position the operator spring 74 is expanding to return the collet lock operator to the neutral position at which the driving pawls are again in alignment with the check pawls and the locking balls 103 will move back into contact with both the back surfaces of the recesses 101 and 102 to allow the collet fingers to retract inwardly back into engagement with the teeth of the hub of the collet lock as shown in FIGURE 1.

With the piston unlocked as described above and free to move, the pressure within the chamber 23a is increased to a level sufficient to displace the piston and piston rod to the right until it is at the extreme right position illustrated in FIGURE 4. The pressure applied to the left end of the piston must be below the value of the pressure pulses employed to unlock the collet fingers since a pressure in excess the value used to unlock the collet fingers would misalign the pawls causing a return of the collet lock to its locked position and thus expanding the primary collet fingers outwardly to prevent movement of the piston.

Figure 3:
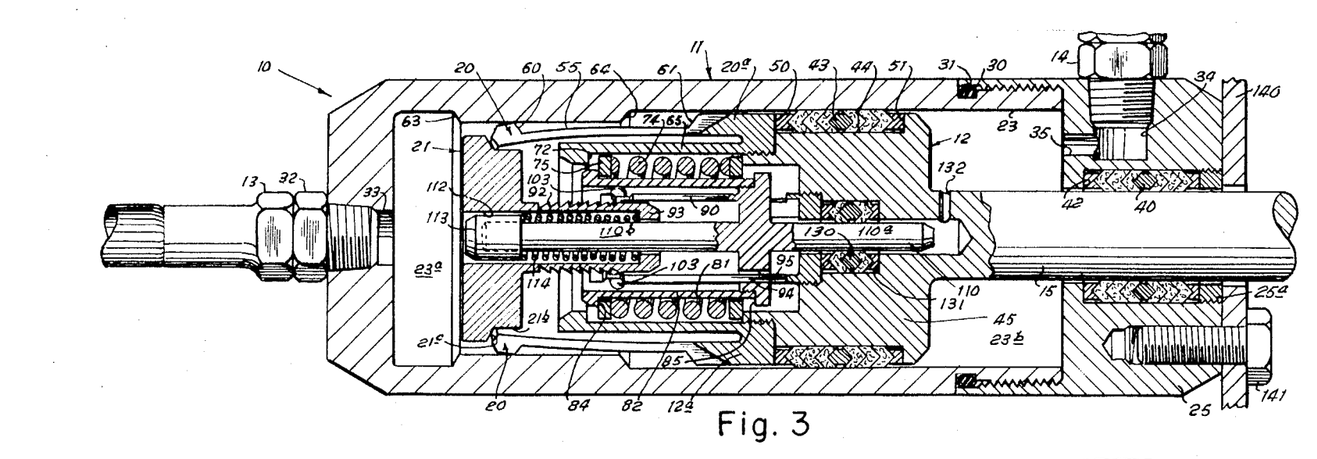
FIGURE 3 is a view partly in section and partly in elevation of the device of FIGURE 1 showing the primary collet fingers of the piston in unlocked position and the piston at an intermediate stage in its movement toward its extreme right position.

FIGURE 3 illustrates the relative positions of the various parts of the operator device when the collet lock has been moved to the left a sufficient distance to allow the primary collet fingers to be cammed inwardly by the flange 62 and the piston assembly is moved toward the right with the primary collet fingers fully unlocked and within the locking flange of the cylinder. The collet fingers are cammed inwardly around the reduced portion 21b of the collet lock. The pressure in the chamber 23a moves the piston to the right until the end 12b of the piston engages the inner face of the head member 25 and the primary collet fingers have cleared the flange 62 and sprung outwardly so that the lock surfaces 53 on the collet fingers may engage the shoulder 64 on the right end of the flange.

When the piston arrives at the far right position and the primary collet fingers have expanded outwardly, the collet lock will remain in its unlocked position as shown in FIGURE 3 even though the collet fingers have sprung outwardly away from the reduced portion of the collet lock. The collet lock is returned to the right to locked position within the primary collet fingers by raising the fluid pressure within the chamber 23a to a level above the value of the predetermined pressure pulses used to unlock the collet lock. The collet lock operator is displaced to the right a sufficient distance to misalign the pawls enough to cause the locking balls to wedge them outwardly away from the hub of the collet lock so that the collet lock spring 114 will expand to return the collet lock to the right to the locked position shown in FIGURE 4. The operator spring 74, which has been compressed due to the movement toward the right of the collet lock operator, will expand to return the operator to its neutral position realigning the pawls so that the locking balls will return to the flat surfaces of their respective recesses allowing the pawls to contract into contact with the hub of the collet lock. The piston and primary collet fingers along with the collet lock will now be in the position shown in FIGURE 4 and the pawls will be back in their neutral positions realigned as shown in FIGURE 1 so that the piston is fully locked in its extreme right posiiton.

When the piston is to be unlocked from the extreme right position illustrated in FIGURE 4 to be returned to the extreme left position of FIGURE 1, the line 14 serves as the supply line and the line 13 serves as the return line for the operating fluid. The fluid under pressure introduced through the line 14 flows through the passages 34 and 35 into the chamber 23b from which it passes through the flow passage 132 into the bore 111 of the piston rod. The conduit 13 is serving as a return line and thus the pressure within the chamber 23a is substantially lower than the pressure being exerted within the bore 111 against the end 110a of the shaft 110, the pressure differential being effective over the area of the shaft sealed by the seal assembly 130 causing a force toward the left tending to move the collet lock operator. The operator is forced toward the left with the driving pawls engaging the collet lock hub to move the collet lock with the collet lock operator a distance determined by the relationship of the strength of the operator spring 74 and the amount of pressure being exerted on the operator. Assuming that that the compressibility of the spring and the pressure pulse being imposed on the collet lock operator are so related that the operator will move the distance of the length of one tooth on the collet lock hub, the operator member will displace the collet lock to the left such a distance. Since the check pawls remain stationary with the piston which is locked in its right position, the pawls will slide over one tooth on the hub of the collet lock to engage the next tooth on the hub to lock the collet lock in position one tooth length to the left when the pressure is relaxed. Thus, the collet lock and the collet lock operator have moved to the left the distance of the length of one tooth and the operator spring has been compressed an equal distance while at the same time the check pawls have moved to the next tooth to the right on the collet lock hub. When the collet lock operator moves to the left relative to the piston the shoulder 85 around the sleeve of the collet lock operator pushes the spring ring 80 toward the spring ring 75 compressing the operator spring and moving the spring ring 75 away from the shoulder 85 at the left end of the collet lock operator. The pressure being applied through the line 14 is now relaxed permitting the operator spring 74 to expand to return the collet lock operator to the right the length of one tooth. When the operator spring has again expanded to its full length the collet lock operator is returned to its neutral position relative to the piston though it has moved one tooth length to the right relative to the collet lock which during the cycle just completed has been displaced to the left the length of one tooth. As the collet lock operator moves the collet lock to the left the collet lock and the operator are moving as a unit and thus there is no relative motion between them to compress the spring 114 within the hub of the collet lock. However, when the collet lock operator is returned by the operator spring to the neutral position to begin another cycle, the collet lock operator is moving to the right relative to the collet lock which is being retained in the position it just moved to by the check pawls. The spring 114 is compressed by the movement of the collet lock operator relative to the collet lock. It will be recognized therefore that when the operator spring is returning the collet lock operator to neutral position in the moving of the piston back toward the left the expansion of the operator spring is opposed by the compressing of the collet lock spring, which is to be distinguished from the stage in the operation of the device when the piston is being moved to the right at which time the expansion of the operator spring is not opposed by the compression of the spring 114. Therefore, it will also be recognized that there must be sufficient differences in the compression characteristics of the springs to permit the operator spring to overcome the opposition of the collet lock spring and move the collet lock operator back to the right to its neutral position. The pressure through the line 14 is now again increased to force the collet lock operator through another cycle during which it moves the collet lock the length of another tooth toward the left and returns the length of a tooth to the right upon decrease of the pressure. The collet lock is jacked or "ratcheted" to the left the distance of the length of four teeth on the collet lock hub at which time the reduced portion 21b of the collet lock is again at a location relative to the pawls that the collet fingers may be cammed inwardly to unlock the piston and permit its movement back toward its extreme left position. The pressure through the line 14 is increased to a value below the pressure pulses needed to unlock the piston to force the piston toward the left causing the shoulder 64 acting against the surfaces 53 on the primary collet fingers to cam the primary collet fingers inwardly. The piston is moved toward the left by the pressure in the chamber 23b until it has been returned to its extreme left position as illustrated in FIGURE 1 at which time the primary collet fingers spring outwardly with the locking surfaces 60 on the fingers engaging the shoulder 63 within the cylinder. The piston is again as its extreme left position with the collet lock still in the unlocked position of FIGURE 3. In order to retain the piston in its extreme left position against pressure which may be exerted in chamber 23a it is necessary that the collet lock be moved back to the right to lock the primary collet fingers outwardly. The collet lock operator is in neutral position while the collet lock is to the left the length of four teeth on the hub and therefore the collet lock spring is compressed. The pressure through the line 14 is again increased to a level in excess of the value of the pressure pulses which had been used to unlock the collet lock so that the collet lock operator is again moved to the left more than the length of one tooth causing misalignment of the sets of pawls wedging the balls 103 between the pawls and forcing the pawls outwardly away from engagement with the hub of the collet lock. This further movement of the collet lock operator compresses the operator spring 74 in addition to misaligning the sets of pawls. With the collet fingers disengaged from the hub, the collet lock spring expands forcing the collet lock back to the right to the locked position of FIGURE 1 and the operator spring forces the collet lock operator back to the right realigning the sets of pawls with the locking balls returning to the positions fully within the recesses 101 and 102. The pawls again retract inwardly into contact with the hub of the collet lock. At the end of the movement to the extreme left position, the collet lock operator is in a neutral position and the sets of pawls are realigned with the collet lock in locked position as shown in FIGURE 1. The piston will remain in this position until movement to the right is again desired at which time the previously described cycles will be repeated by transmitting the pressure pulse code to the chamber.

It will be evident from the above description that the operator device is readily adaptable to use in a system such as that illustrated in FIGURE 8 where several of the devices are arranged for operation from a common control which transmits the coded pressure pulses through single supply and return lines to all of the devices. Any particular combination of pressure pulses will operate only that device which is designed to respond to that combination. For example, assuming the particular operator device 10, as shown in FIGURE 8, is to be operated, it is designed to respond to four pressure pulses within the range of two to four hundred pounds per square inch. The transmission of four such pressure pulses from the controller 160 through the conduits leading to the operator device will cause the collet lock operator to be moved to its unlocked position. As shown, the operator devices of FIGURE 8 are mounted in a vertical position and thus whether the line 13 or 14 is employed as the supply line will depend upon the position that the operator device 10 is in and the direction it is to be moved. As previously stated the controller 160 readily establishes either of the conduits as a return or supply line and also controls the pressure of the fluid within the conduits. The predetermined code of pressure pulses which will actuate the operator device 10 utilizes a pressure level below that to which the operator devices 10a through 10d are designed to respond. Therefore, the pressure pulses conducted through the conduits, while they will reach each of the other operator devices, will not move the collet lock operators of the devices sufficiently to unlock the piston assemblies of the devices since the pressure level is too low. The operator device 10b is operable by transmitting to it the required number of pressure pulses within the range of seven to eight hundred pounds per square inch, which range is obviously in excess of the pressure at which the operator devices 10 and 10a are designed to respond and is below the pressure at which the operator device 10c is to function. The pressure pulses in the proper range for the device 10b will unlock its collet lock. These pulses will also misalign the pawls in the devices 10 and 10a to the extent that the collet lock will return from whatever position it is in to a locked position. In addition these pulses will not move the collet lock operator of the device 10d enough to unlock its piston. It will be evident therefore that all of the operator devices may be operated by transmission of the proper coded pressure pulses from the controller and that the devices will be non-responsive to any pressure pulses which are not of the proper value and number to actuate the desired device. If the selector 160 is controlled by automated equipment, protection is thus provided against malfunctioning of the equipment to the extent that if improper pressures are transmitted to the operator devices they will not function. If the controller is manually operated, use by personnel not in possession of the required code will simply result in a nonfunctioning of the operator devices and therefore the necessity for the code provides protection against operation by inexperiences or unauthorized personnel.

It will now be seen that there has been described and illustrated a new and improved form of operator device which is used to perform a useful work function in response to predetermined pressure pulses transmitted to the device.

It will be further seen that the operator device of the invention is non-responsive to pressure pulses which are outside of a predetermined range thus providing protection against malfunctioning of automated equipment and operation by unauthorized or inexperienced personnel not in possession of the code for which the operator device is designed.

It will be further seen that the operator device may be employed as a single unit situated in a remote location connected to a control point by fluid transmission lines.

It will be additionally seen that the operator device of the invention may be used in multiples in a system in which a single set of fluid lines extends to the several operator devices of the system from one controller which controls both the direction of fluid flow in the lines and the pressure of the fluid whereby the several operator devices may be caused to operate by pressure pulses transmitted through common fluid lines.

It will be further seen that the operator device includes a piston assembly which reciprocates and is controllable in either direction of reciprocation by application of the required pressure pulse code.

It will also be seen that the operator device includes a collet lock operator which does not move a sufficient distance to actuate the device if a pressure pulse is transmitted to the device below the required pressure level and which is automatically returnable to a neutral position when a pressure pulse in excess of the predetermined level is transmitted to the device.

It will also be seen that the operator device includes driving pawls and check pawls which are misaligned in response to excessive pressures causing locking balls between the pawls to become wedged to expand the pawls out of contact with the collet lock allowing the collet lock to be returned by a spring to a fully locked position.

It will be further seen that the operator device may be readily designed to respond to any of a number of combinations of fluid pressure pulses.

It will be evident that while the operator device of the invention has been described in terms of the collet lock operator moving the length of one tooth on the collet lock hub in response to each pressure pulse and movement the length of four teeth being required to fully disengage the collet lock, the distance moved by the collet lock operator and the number of pressure pulses required to unlock the collet lock may readily be varied as desired. The size of the teeth on the collet lock hub, the strength of the collet lock operator spring and the collet lock spring together with the pressures to be employed all are factors which are considered in the design of the device and the pressure code to which the device responds.

It will be evident that variations in the procedure of operating the device may also be employed. For example, when the piston assembly is in the far right position as illustrated in FIGURE 4, the normal operating procedure for unlocking the primary collet fingers is to transmit the pressure pulses through the line 14 into the chamber 23b. The pressure pulses may, however, be transmitted through the line 13 in which event the movements of the collet lock operator and the collet lock will be the same as when unlocking of collet lock with the piston assembly in the extreme left position of FIGURE 1. When this alternative procedure of unlocking the piston assembly is used, the pressure in the line 14 will have to be again raised after unlocking the piston so that the piston assembly may be displaced to the left.

Figure 13:
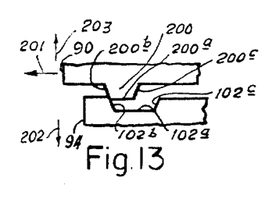

An alternative form of pawl structure which eliminates the use of the locking balls is illustrated in FIGURES 12 and 13. The check pawls 94 are provided with the recesses 102 as previously described. The recess 102 has the bottom surface 102a, the shoulder 102b and the shoulder 102c. The driving pawls are, however, altered by providing in lieu of a recess the lug 200 which extends outwardly from each edge of the pawls at substantially the same longitudinal position as occupied by the recesses in the adjacent check pawls. The lug 200 has an outer surface 200a, which may be flat or curved, and the shoulders 200b and 200c. The lug on the driving pawls cooperates with the recesses in the edges of the check pawls to cam the pawls radially outwardly out of engagement with the hub of the collect lock in the same manner as previously described in connection with the expansion of the pawls by the locking balls. The FIGURE 13 illustrates the relative longitudinal movement of a driving pawl toward the end of a check pawl causing the engagement of the shoulder 200b on the lug of the driving pawl with the shoulder 102b within the recess of the check pawl. So long as the outer surface 200a of the driving pawl lug is moving along the bottom surface 102a of the recess of the check pawl the pawls remain a normal distance apart. When the shoulders 200b of the lugs of the driving pawls engage the shoulders 102b of the check pawls, the outward radial expansion of the pawls begins with the shoulders on the pawls sliding relative to each other exerting the same effective forces on the pawls as shown in FIGURE 11 causing all the pawls to move outwardly out of engagement with the hub of the collet lock. As shown in FIGURE 13, as the driving pawl moves in the direction of the arrow 201 relative to the check pawl, the pawls are forced apart by the cooperative action of the recess and the lug causing the check pawl to move in the direction of the arrow 202 and the driving pawl to move in the direction of the arrow 203. Since all the pawls have equal forces applied to their opposite edges near their free ends the net result is the outward expansion of the ends of the pawls. The arrows 202 and 203 represent the reaction forces on the ends of the pawls as a result of the engagement of the shoulders 102b and 200b. Since each of the pawls has a similar reaction force acting upon it, the resultant of the forces will be in a radial outward direction as indicated by the arrow 101f in FIGURE 11.

When the operator device is used in an application where the force required to be delivered by the piston rod to operate the apparatus to which the rod is secured is in excess of the code pressure for unlocking the device, the rod may be connected in such a manner that sufficient free play is permitted between the piston rod and the apparatus that the load of the apparatus is not imposed on the piston rod until the collet fingers are within the flange 62. For example, if the piston assembly is in the left position as shown in FIGURE 1 the piston rod is connected to the apparatus in such a manner that when the collet lock is jacked from within the collet fingers the piston assembly is movable by the code pressure to a position which will place the collet fingers within the flange 62. When the collet fingers enter the flange 62 they obviously can not be expanded by the collet lock as shown in FIGURE 3 and thus so long as the fingers are within the flange the collet lock can not be returned to its locked position. Therefore, while the collet fingers are within the flange the pressure may be raised above the predetermined coded pressure without relocking the piston assembly and thus the operator device may perform a work function which requires a pressure in excess of the predetermined coded pressure. Whether the piston assembly is moving to the right or toward the left it is not relockable so long as the primary collet fingers are within the flange; and thus where large amounts of force in excess of the code pressure are required to be delivered by the operator device, the device is connected to the apparatus it is to operate so as to have the work function performed while the collet fingers are within the flange. It is to be recognized, however, that even with such an arrangement the piston assembly is relockable by excessive pressures at all times that the collet fingers are not within the locking flange of the cylinder.

It will also be recognized that while the operator device has been described in terms of its being lockable at extreme right and left positions the piston assembly may be constructed to be lockable at other selected positions along its longitudinal travel path within the cylinder. For example, additional locking flanges may be provided and the length of the flange 62 may be changed. Also, it will be recognized that the cylinder may be provided with one or more internal annular recesses for engagement of the collet fingers for locking the piston assembly at selected positions. With this alternative arrangement the locking recesses within the cylinder would replace the disclosed locking flange 62 with the collet fingers moving further outwardly to engage the locking recesses of the cylinder.

A further modification which may be made in the device is the use of a spring for returning the piston assembly to an end position. For example, a spring may be placed within chamber 23b to return the piston assembly to the left while pressure fluid through line 13 would displace the piston to the right as previously explained. Locking and unlocking of the piston assembly would still be accomplished as previously explained. Such a spring for moving the piston assembly toward one end position may also be provided on the apparatus actuated by the operator device with the locking and unlocking steps along with displacement of the piston assembly in the other direction being carried out by fluid under pressure in the previously described manner.

What is claimed and desired to be secured by Letters Patent is:

1. An operator device including: cylinder means having locking shoulder means therein; piston means slidably disposed within and adapted to reciprocate relative to said cylinder means; releasable locking means carried by said piston means for releasably engaging said piston means with said locking shoulder means of said cylinder means at at least one predetermined position of said piston means within said cylinder means, said piston having means co-acting with said locking means operable in response to application of predetermined pressure differential conditions applied across said piston to release said locking means of said piston from engagement with said locking shoulder means of said cylinder, said locking means being also responsive to a pressure differential across said locking means of said piston in excess of said predetermined differential for re-engaging said piston with said locking shoulder means of said cylinder means; and means operatively associated with said cylinder means for conducting fluid under pressure to said cylinder means at opposite ends of said piston.

2. An operator device including: cylinder means having locking shoulder means therein; piston means slidably disposed within said cylinder means and adapted to reciprocate longitudinally therein; locking means carried by said piston means for releasably engaging said locking means of said piston means with said locking shoulder means of said cylinder means at at least one position in said cylinder means of said piston means, said piston means having operating means co-acting with said locking means operable in response to a predetermined pressure pulse code applied to an end of said piston for releasing said locking means of said piston from locking engagement with said locking shoulder means of said cylinder means, said locking means and said operating means being further responsive to a pressure applied to said piston in excess of the pressure level of the said code for re-engaging said locking means with said locking shoulder means of said cylinder means; and means operatively associated with said cylinder means for admitting fluid under pressure into said cylinder means at opposite ends of said piston for operating said operating means and said piston.

3. An operator device including: cylinder means having locking shoulder means therein; piston means slidably disposed within said cylinder means for moving longitudinally within said cylinder means; expandable locking means on said piston for releasably engaging said locking shoulder means of said cylinder means for locking said piston at at least one position within said cylinder means; operating means carried by said piston and movable relative thereto in response to a predetermined pressure differential pulse code applied across said piston for moving said expandable locking means into locking engagement with said locking shoulder means of said cylinder means and for releasing said expandable locking means of said piston from locking engagement with said locking shoulder means of said cylinder means, said operating means being non-responsive to a pressure below a predetermined level and being movable to a position for locking said expandable locking means with said locking shoulder means of said cylinder means in response to a pressure differential in excess of said predetermined level; and means associated with said cylinder means for conducting fluid into said cylinder means at opposite ends of said piston for operating said operating means and said piston.

4. An operator device including: cylinder means having locking shoulder means therein; piston means slidably disposed within said cylinder means and adapted to slide longitudinally therein; piston rod means extending from one end of said piston through one end of said cylinder means; collet locking finger means carried by said piston for releasably engaging said locking shoulder means of said cylinder means at at least one position of said piston within said cylinder means; collet lock means carried by said piston means engageable with said collet locking finger means for locking said collet locking finger means in expanded locking position in engagement with said locking shoulder means of said cylinder means and movable out of such engagement for releasing said collet locking finger means for inward movement away from locking engagement said locking shoulder means of said cylinder means for releasing said piston from locked position in said one position in said cylinder means; collet lock operator means carried by said collet lock means and said piston and slidable relative thereto in response to pressure differential conditions of predetermined magnitudes applied across said piston for moving said collet lock operator means between one position for locking said collet locking finger means in an outwardly expanded position and another position for releasing said collet locking finger means for movement inwardly from locking position; and means associated with said cylinder means for admitting a fluid pressure within said cylinder means to opposite ends of said piston for actuating said operator means and said piston.

5. An operator device including: cylinder means; piston means disposed within and slidable longitudinally relative to said cylinder means; piston rod means secured to one end of said piston and extending through an end of said cylinder means; collet finger means carried by said piston means to releasably lock said piston means within said cylinder means at at least one position of said piston means relative to said cylinder means; collet lock means carried by said piston means, said collet lock means being movable between a first position for holding said collet finger means in an expanded locked position and a second position for releasing said collet finger means to unlock said piston from said cylinder; collet lock operator means carried by said piston means and slidable relative thereto, said collet lock operator means being releasably engageable with said collet lock means for moving said collet lock means between said first and said second positions; means for disengaging said collet lock operator means from said collet lock means; means for moving said collet lock operator means to a neutral position; and means for admitting fluid into said cylinder at opposite ends of said piston.

6. An operator device including: a cylinder; a piston slidably disposed within said cylinder; a piston rod carried by said piston extending through one end of said cylinder; a plurality of collet fingers carried by and radially positioned around said piston for releasably engaging said piston with said cylinder at at least one predetermined position relative to said cylinder; a collet lock carried by said piston and movable relative to said piston between a first position for locking said collet fingers outwardly in engagement with said cylinder and a second position releasing said collet fingers to move inwardly away from engagement with said cylinder to free said piston for longitudinal movement within said cylinder; a collet lock operator carried by said piston and movable relative thereto, said collet lock operator being engageable with said collet lock for moving said collet lock between said first and second positions, said collet lock operator being movable relative to said piston in response to a predetermined pressure differential applied across said piston; said collet lock operator being non-responsive to a pressure differential below said predetermined value and being operable in response to a pressure differential across said piston in excess of said predetermined value to move to a position to permit said collet lock to return to a locked position and said collet lock operator to be moved to a neutral position relative to said piston; and means for admitting fluid into said cylinder to opposite ends of said piston.

7. An operator device including: a cylinder; a piston slidably disposed within said cylinder for longitudinal movement therein; a piston rod connected to said piston and extending through one end of said cylinder; a plurality of collet fingers carried by and radially positioned around said piston for releasably engaging said cylinder; a collet lock operatively associated with said piston and movable relative thereto for releasably locking said collet fingers in an outward position in engagement with said cylinder and for releasing said collet fingers to free said piston from said cylinder for movement relative thereto; a collet lock operator carried by said piston and movable relative thereto; biasing means engageable between said collet operator and said piston for biasing said operator toward a neutral position relative to said piston; said collet lock operator and said piston including means for releasably engaging said collet lock for moving said collet lock between one position for locking said collet fingers outwardly and another position for releasing said collet fingers for movement inwardly to free said piston from said cylinder; said collet lock operator being movable in response to a predetermined pressure differential applied across said piston; and means for admitting fluid pressure to opposite ends of said piston within said cylinder.

8. An operator device including: a cylinder; a piston slidably disposed within and movable longitudinally relative to said cylinder; a plurality of collet fingers carried by and radially positioned around said piston for releasably engaging said piston with said cylinder; a collet lock operator operatively associated with said piston and movable between a first position within said collet fingers for locking said collet fingers outwardly in engagement with said cylinder and a second position for releasing said collet fingers for movement inwardly away from engagement with said cylinder; a collet lock operator carried by said piston and slidable relative thereto in response to a predetermined pressure differential applied across said piston; said collet lock operator including pawl means engageable with said collet lock for moving said collet lock between said first and said second positions; said piston including pawl means engageable with said collet lock for releasably securing said collet lock relative to said piston; means for disengaging said first and said second mentioned pawl means from said collet lock to release said collet lock to be returned to said first position; means engaged between said collet lock and said collet lock operator for moving said collet lock to said first position; means associated with said piston and said collet lock operator for biasing said collet lock operator to a neutral position relative to said piston; and means associated with said cylinder for admitting fluid to opposite ends of said piston within said cylinder.

9. An operator device including: a cylinder; a piston slidably disposed within said cylinder for longitudinal movement therein; a piston rod carried by said piston and extending through an end of said cylinder; a plurality of collet fingers carried by and radially positioned around said piston for releasable engagement with said cylinder to lock said piston within said cylinder; a collet lock operatively associated with said piston and movable longitudinally relative thereto between a first position for holding said collet fingers outwardly in engagement with said cylinder and a second position releasing said collet fingers for inward movement away from engagement with said cylinder; a collet lock operator slidably disposed within said piston and adapted to move longitudinally relative thereto in response to a predetermined pressure differential applied within said cylinder across said piston; said collet lock operator including driving pawls engageable with said collet lock for moving said collet lock between said first and second positions; said piston including check pawls engageable with said collet lock for releasably engaging said collet lock with said piston; compressible means between said collet lock and said collet lock operator for returning said collet lock to said first position when said pawls are disengaged from said collet lock; compressible means between said collet lock operator and said piston for biasing said collet lock operator toward a neutral position relative to said piston; means for disengaging said pawls from said collet lock in response to a pressure differential in excess of said predetermined pressure differential; and means associated with said cylinder for admitting fluid into said cylinder to opposite ends of said piston.

10. An operator device including: a cylinder; a piston slidably disposed within said cylinder for longitudinal movement therein; a plurality of collet fingers carried by and radially spaced around said piston for releasably securing said piston against longitudinal movement within said cylinder; a collet lock operatively associated with said piston and movable relative thereto between a first position for holding said collet fingers outwardly in engagement with said cylinder and a second position releasing said collet fingers for inward movement out of engagement with said cylinder, said collet lock having a hub provided with a plurality of external annular teeth; a collet lock operator carried by and movable longitudinally relative to said piston in response to a predetermined pressure differential applied within said cylinder across said piston; said operator member including a longitudinally extending shaft for supporting said operator member within said piston and to provide a support and guide for said collet lock, said collet lock sliding over said shaft; said collet lock operator including driving pawls releasably engageable with said teeth on said hub; said piston including check pawls releasably engageable with said teeth on said hub for locking said collet lock relative to said piston; means associated with said driving and said check pawls for wedging said pawls outwardly out of engagement with the teeth on the hub when said driving and said check pawls are longitudinally misaligned from each other a predetermined distance; spring means engaged between said collet lock and said shaft of said collet lock operator for moving said collet lock to said firts position when said pawls are wedged out of engagement with teeth of said hub; spring means between said collet lock operator and said piston for biasing said collet lock operator toward a neutral position relative to said piston; said shaft of said collet lock operator being exposable to fluid pressure at opposite ends of said piston; said spring between said collet lock operator and said piston and said spring between said shaft of said collet lock operator and said collet lock having compression characteristics holding said collet lock operator against movement relative to said piston until a minimum predetermined pressure differential is applied across said piston and permitting excessive movement of said collet lock operator relative to said piston when said pressure differential exceeds a predetermined maximum whereby said driving and check pawls are misaligned to wedge said pawls out of engagement with said teeth on said hub; and means for admitting fluid into said cylinder to opposite ends of said piston.

11. An operator device including: a cylinder; a piston slidably disposed within said cylinder; a plurality of collet fingers on said piston radially positioned around and extending outwardly from one end of said piston; a sleeve on said piston extending within and concentric with said collet fingers; a collet lock operatively associated with said piston and movable relative thereto between a first position wherein an outer rim around said collet lock holds said collet fingers expanded outwardly in locking engagement with said cylinder and a second position wherein said rim is moved from within said collet fingers to release said fingers to be moved inwardly away from engagement with said cylinder, said collet lock having a hub provided with a plurality of annular teeth; a collet lock operator positioned within said sleeve on said piston, said collet lock operator including a sleeve positioned within and concentric with said sleeve of said piston; a collet lock operator spring confined between said sleeve on said piston and said sleeve on said collet lock operator for biasing said collet lock operator to a neutral position relative to said piston; driving pawls on said collet lock operator engageable with said teeth on said hub of said collet lock for moving said collet lock between said first and said second positions; check pawls on said piston within and concentric with said sleeve of said collet lock operator between said driving pawls, said check pawls being engageable with said teeth on said collet lock hub for holding said collet lock at positions to which said collet lock is moved by said driving pawls; said collet lock operator including a shaft extending at one end into a bore provided through said piston and at the other end through said collet lock and collet lock hub whereby a pressure differential applied across said piston is applied to said shaft to move said collet lock operator relative to said piston; a collet lock spring engaged between said collet lock and said shaft of said collet lock operator for returning said collet lock to said first position when said pawls are wedged out of engagement with the hub of said collet lock; means associated with said driving pawls and said check pawls whereby longitudinal misalignment of said driving pawls relative to said check pawls in excess of the predetermined distance causes said pawls to be wedged radially outwardly out of engagement with said teeth on said hub of said collet lock; said collet lock operator spring and said collet lock spring having compression characteristics limiting the movement of said collet lock operator to a predetermined distance when said collet lock operator is moved relaitve to said piston in response to a predetermined pressure differential applied across said piston; said springs further permitting sufficient movement of said collet lock operator to excessively misalign said driving and said check pawls in response to a pressure in excess of said predetermined differential; and means for admitting fluid to the opposite ends of said piston within said cylinder.

12. An operator device including: a cylinder; a piston slidably positioned within said cylinder to move longitudinally between opposite end positions; a piston rod connected to said piston and extending through one end of said cylinder; a plurality of collet fingers positioned radially around and extending from one end of said piston; an internal annular locking flange formed within said cylinder; said collet fingers and said locking flange cooperating to releasably engage said piston at opposite end positions within said cylinder; a sleeve formed on said piston within and concentric with said collet fingers, said sleeve having an internal anular recess extending substantially the full length of said sleeve; a collet lock operator positioned within said sleeve of said piston and adapted to move longitudinally relative to said piston; said collet lock operator including a base plate, a shaft extending through and perpendicular to said base plate, the longitudinal axis of said shaft being positioned coincident with the longitudinal axis of said piston, and a sleeve extending from said base plate concentric with said shaft, said sleeve having an external annular recess of substantially the same length as said recess within said sleeve on said piston; a collet lock operator spring disposed within said sleeve on said piston and around said sleeve of said collet lock operator, said spring being confined within said recesses of both of said sleeves, said spring being adapted to bias said collet lock operator toward a neutral position within and relative to said piston; a collet lock having a hub provided with a plurality of annular teeth slidably positioned on said shaft of said collet lock operator, said hub being movable within said sleeve of said collet lock operator, said collet lock having an external annular flange movable to a first position within said collet fingers for locking said fingers outwardly into engagement with said locking flange within said cylinder, said collet lock being movable to a second position for releasing said collet fingers to move inwardly out of engagement with said locking flange; a collet lock spring confined between said shaft on said collet lock operator and said collet lock for returning said collet lock to said first position when said collet lock is disengaged from said collet lock operator; a plurality of driving pawls extending from said base plate of said collet lock operator concentric with and within said sleeve of said collet lock operator, said pawls being radially spaced around said hub of said collet lock and spaced apart from each other, each of said driving pawls being engageable with said teeth on said hub of said collet lock for moving said collet lock between said first and said second positions; a plurality of check pawls extending from said piston within and concentric with said sleeve of said collet lock operator through said base plate of said operator, one of said check pawls extending between each pair of said driving pawls in substantial alignment therewith when said collet lock operator is in neutral position relative to said piston, said check pawls being engageable with the teeth on said hub of said collet lock for locking said collet lock relative to said piston as said collet lock is moved by said driving pawl; means provided by said driving pawls and said check pawls for expanding said pawls radially outwardly to release said pawls from said collet lock hub in response to a pressure in excess of a predetermined maximum, said pawls being misaligned longitudinally in excess of a predetermined distance in response to said pressure; means providing a fluid passage into one end of said cylinder; means providing a fluid passage into the other end of said cylinder; and means providing a passage through said piston to expose the end of said collet lock operator shaft to fluid pressure within said cylinder at the end of said piston opposite said collet fingers.

13. An operator device according to claim 12 wherein said means for expanding said pawls includes: the edges of each of said driving pawls and each of said check pawls being provided with a recess near the free end of said pawls, said recesses being positioned longitudinally along said pawls such that when said pawls are in substantial longitudinal alignment said recesses in adjacent pawls will face each other to accommodate a locking ball between each of said adjacent driving and check pawls; a locking ball disposed in said recesses between each pair of adjacent pawls; the length of said recesses being sufficient to permit a predetermined amount of longitudinal misalignment between said driving pawls and said check pawls; said recesses being shaped to exert a wedging effect upon said locking balls when said pawls are misaligned more than said predetermined amount whereby the reaction forces of said locking balls upon said pawls wedge said check pawls and said driving pawls radially outwardly out of engagement with said hub of said collet lock to permit said spring between said collet lock and said shaft of said collet lock operator to return said collet lock to said first position and said spring between said sleeve of said piston and said sleeve of said collet lock operator to return said collet lock operator to a neutral position relative to said piston; said check pawls and said driving pawls being realigned when said collet lock operator is in said neutral position; and said locking balls moving back into the area within said recesses between said pawls permitting said pawls to retract inwardly to re-engage said hub of said collet lock.

14. An operator device according to claim 12 wherein said means provided by said driving pawls and said check pawls for expanding said pawls includes: cooperating recesses and lugs along the adjacent edges of said pawls near the free ends thereof, an edge of one pawl having a recess formed therein and the edge of the adjacent pawl having a lug formed thereon extending into said recess and movable therein a predetermined distance without disturbing the spatial relationship between said pawls, said recesses and said lugs being shaped to inneract to apply lateral radially outward forces to said pawls when said pawls are misaligned with each other farther than said predetermined distance in response to a pressure in excess of a predetermined maximum causing each of said lugs to engage one end of each of said recesses whereby said adjacent pawls are forced farther apart by engagement of said lugs with said ends of said recesses, said radially outward movement of said pawls effecting disengagement of said pawls from said hub of said collet lock whereby said spring between said collet lock and said shaft of said collet lock operator may return said collet lock to said first position and said spring between said sleeve on said piston and said sleeve on said collet lock operator may return said collet lock operator to a neutral position relative to said piston, said check pawls and said driving pawls being realigned when said collet lock operator is in said neutral position, and said lugs moving away from the end of said recesses in said adjacent pawls releasing said pawls to retract inwardly back into engagement with said hub of said collet lock.

15. A system for performing a plurality of mechanical work functions, each of said work functions being carried out in response to a different pressure pulse code transmitted through a fluid medium, said system including: a plurality of operator devices each operable to perform at least one said mechanical work function in response to actuation by predetermined different pressure pulse code signals transmitted by fluid pressure pulses to all of said devices to selectively operate a specific one of said devices, said operator devices each including a cylinder, a piston reciprocable in said cylinder, said piston being lockable within and relative to said cylinder at predetermined locations within said cylinder, locking means for releasably locking said piston in said cylinder at said predetermined locations, said locking means being responsive to said predetermined pressure pulse code signal for engaging and disengaging said locking means; common fluid supply-return lines extending to all of said operator devices; and controller means connected to said lines for selectively controlling the pressure and direction of fluid flow through said lines for generating a predetermined pressure pulse code signal in fluid directed from said controller to said operator devices, said controller being adapted to vary said pressure pulse code signal in accordance with the code desired to be transmitted for operating any specific one of said operator devices.

References Cited

UNITED STATES PATENTS

| 1,994,974 | 3/1935 | Wiedmann | 60—97 |
| 2,026,938 | 1/1936 | Eiserer | 60—97 |
| 2,568,561 | 9/1951 | Perdue et al. | 92—26 |
| 3,072,105 | 1/1963 | Johnson | 92—26 |
| 3,182,565 | 5/1963 | Millard | 92—26 |
| 3,251,278 | 5/1966 | Royster | 92—18 |

MARTIN P. SCHWADRON, *Primary Examiner.*

IRWIN C. COHEN, *Assistant Examiner.*

U.S. Cl. X.R.

91—44, 413; 92—26